UNITED STATES PATENT OFFICE.

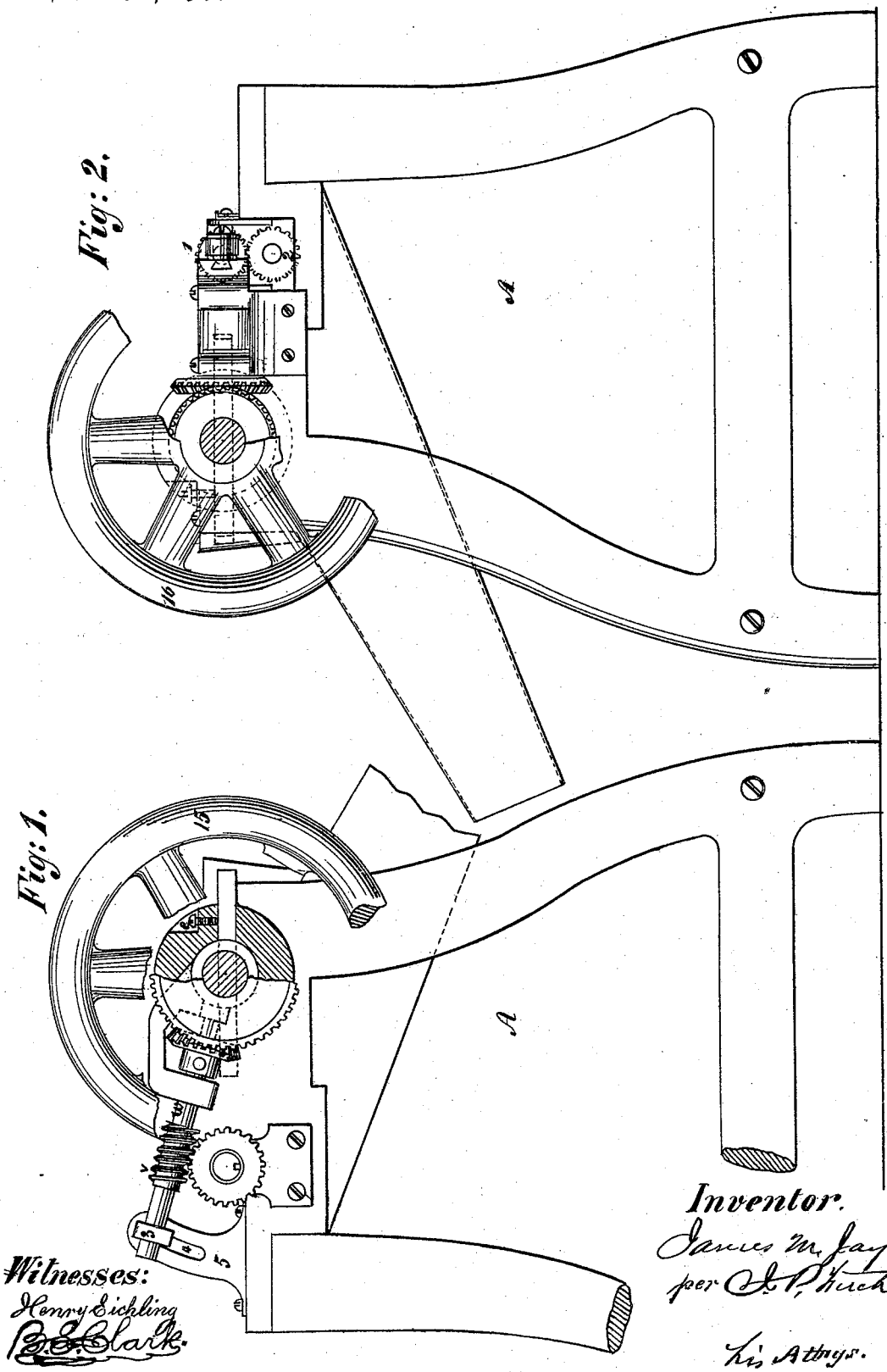

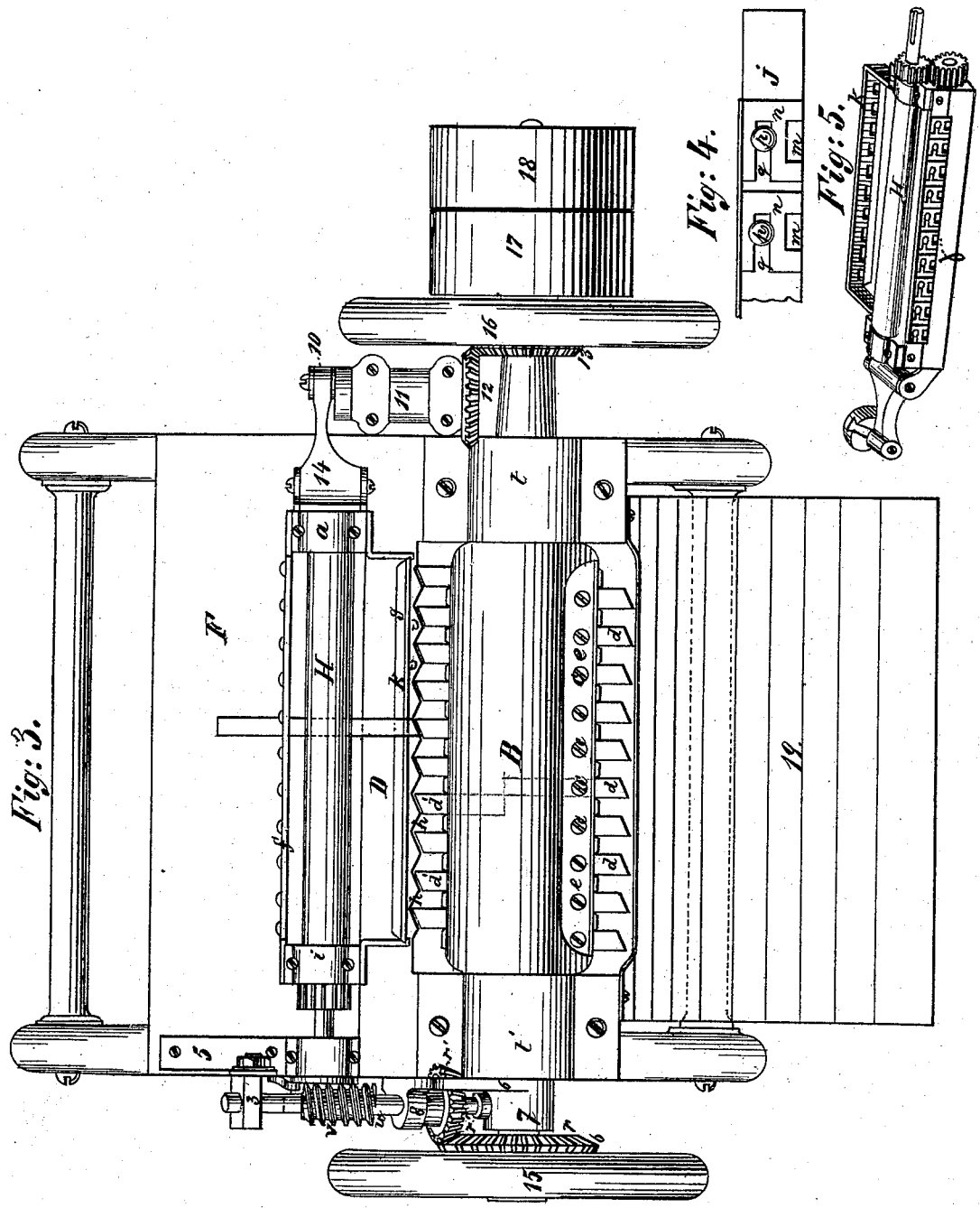

JAMES M. JAY, OF NEW YORK, ASSIGNOR TO HIMSELF AND GEORGE LESTER, OF BROOKLYN, NEW YORK.

IMPROVEMENT IN MACHINES FOR CUTTING GLAZIER'S POINTS.

Specification forming part of Letters Patent No. 171,286, dated December 21, 1875; application filed March 9, 1875.

*To all whom it may concern:*

Be it known that I, JAMES M. JAY, of the city, county, and State of New York, have invented a machine specially designed for Cutting Glazier's Points, but adapted to cutting also brads, nails, and other tapering articles made of metal, of which the following is a specification, reference being had to the accompanying drawing forming part of the same.

Figure 1 is an elevation of one side of machine containing my invention. Fig. 2 is a similar view of the opposite side of the same. Fig. 3 is a plan of the same. Fig. 4 is a detail view of a portion of the side rail of the feed-carriage, showing the adjustable guide-plates. Fig. 5 is a perspective view of the feed-carriage.

My invention consists in the combination, in a machine specially designed for cutting glazier-brads, of one or more V-shaped stationary cutter-bars, having, each, two cutting-edges inclined to each other, and forming two sides of a triangle, two or more revolving or reciprocating cutters, each two having severally cutting-edges respectively corresponding in inclination to the cutting-edges of each triangle of the cutter-bar, one to one side of the triangle, and the other to the other side, and a carriage which feeds strips of metal to the cutters, and at the same time shifts them severally from one side to the other of the triangular edges of the cutter-bar, as hereinafter described, whereby glazier's points, or other angular or tapering pieces, may be automatically cut from strips of tin, or other metal, the cutting taking place first on one edge, and then on the other of the inclined faces of the said triangles of the cutter-bar.

A is the frame, upon which the working parts of the machine are mounted. B is a cylinder, which revolves in journal-boxes $t\ t'$ secured to the frame A, and to which are attached series of cutters $d\ d'$ made of bars of steel, extending preferably through the diametrical center of the cylinder, an opening being made through the cylinder for the purpose. The bars $d$ of one set extend beyond the periphery of one side of the cylinder, and are beveled at their ends, as shown; and the bars $d'$, which lie between and alternate with the bars $d$, extend beyond the periphery of the cylinder on the opposite side, and are beveled in a direction opposite to those first named. The bars are fastened in the cylinder by set-screws $c$, a triangular cut, $e$, being made in the face of the cylinder, as shown, to afford opportunity to insert the screws in the body of the cylinder. C is the cutter-bar formed of a heavy steel plate screwed firmly in place upon the frame A. The cutting-edge of this bar is serrated, so as to form a series of triangular projections, $h$, each projection having two cutting-edges meeting and forming an angle at the apex of the serration. The base of the triangle, of which the opposite faces of each serration form two sides, is equal to the width of two of the bars $d$, so that the two bars $d$, which range opposite any one of the said angular projections or serrations $h$ of the cutter-bar, will, when revolved with the cylinder B, traverse one of the inclined faces of said projection, and the other the other face of the same. D is the feed-carriage, which consists of a frame composed of side rails $f$ and $g$ secured to end blocks $a\ i$. Upon the side, above the said side rails, are fixed the guide-bars $j\ k$. The bar K, between the feed-rolls and the cutter-bar, has in its lower edge openings or notches, as shown in the drawings, on a level with the face of the table or top F of the frame, and with the top of the under feed-roll H. The other bar $j$ is so fixed that its lower edge is raised somewhat above the level of said table, and to its front face a series of adjustable guides, $n$, (seen enlarged at Fig. 4) are fixed. They correspond in number to the notches in the plate K, and each has a notch or opening, $m$, in its under edge. They are secured to the bar $j$ by screws $p$ through slots $q$, whereby they are adjustable from side to side, and the upper edge of the bar $j$ being turned over forms a lip, which prevents the guides $n$ from swinging on the screws $p$ out of position.

In this frame are mounted the feed-rolls H I, which have their bearings in boxes connected with the said blocks $a\ i$ of the feed-carriage. The upper roll receives motion from the shaft of the cylinder B by means of the beveled gears $r\ r'$, shaft $u$, and worm and gear $v\ w$, and the lower roller being geared to the upper one by the gears 1 2.

The shaft $u$ carrying the gear $w$ and the worm or endless screw $v$, has its bearings at one end in the arm 3, which is held in a slot, 4, in the upright bracket 5. At the other end the shaft $u$ has its bearing in the sleeve-yoke 6. This yoke has at one end a sleeve, 7, through which passes the shaft of the cylinder B, and at the other end a short arm or projection, 8, through which passes the shaft $u$. By this arrangement of parts, the arm 3 may be raised or lowered to adjust the worm $v$ to the gear $w$ of different sizes, whereby the speed of the feed-roller may be regulated. The feed-carriage is fitted into a deep groove in the top of the frame A, so as to slide from side to side, and a short reciprocating motion is given to it by means of the crank or eccentric 10 on the shaft 11, which receives motion from the shaft of the cylinder B through the beveled gears 12 and 13. The connecting-rod 14, hinged to the feed-carriage at one end, articulates with the crank-pin 10 at the other, the said crank-pin being adjustable in a dovetailed slot, cut across the end face of the shaft 11, to regulate the throw of the feed-carriage. The shaft of the cylinder B is provided with balance-wheels 15 and 16, to give momentum to the cutters. 17 is a pulley by which said shaft is driven, and 18 a loose pulley. 19 is a spout through which the product of the machine is conducted away.

To operate this machine, tin or other sheet metal is cut into narrow strips that will pass through the openings or notches in the side bars of the feed-carriage. A single strip is seen, thus introduced and ready to be cut, in Fig. 3. The strips lie between the feed-rolls, by which they will be fed to the cutters, and guided by the notches through which they pass. Each of the cutters opposite the several strips will cut off a piece on an inclined line across the strip. Then, while the cylinder B is making a half-revolution to bring the opposite cutters to the cutter-bar, the movement of the feed-carriage will shift the strips onto the opposite side, respectively, of the angular serrations of the cutter-bar, and said cutters having a reverse bevel will cut a triangular piece from the strip of metal. Thus at each revolution of the cutter-cylinder the strip will be shifted from side to side on the serrations of the cutter-bar, and each two cutters acting alternately—one on one inclined edge, and the other on the other—the strip, being fed to the cutter at the proper rate of speed, will be cut up into triangular pieces or glazier-points. Of course, by changing the angles of the cutter-bar, and the bevel of the cutters, pieces of any desired taper may be cut.

I have described the revolving cutting-instrument as composed of a separate bar for each inclined edge of the several angular prominences on the stationary cutter, because I regard this the preferable form. But, of course, the revolving cutters, on each side of the cylinder, may be a single bar extending the whole length of the stationary cutter-bar, and provided with angular notches or serrations corresponding to those on the said stationary cutter-bar. With such an arrangement of parts the strip of tin being, by the action of the feed-carriage, shifted from side to side of the said serrations, as before described, the result will be the same.

I am aware that a machine for cutting nails exists, in which the cutters are arranged on a plan somewhat similar to mine, and in which the metal from which nails are cut is shifted back and forth from one set of cutters to another. But the apparatus employed to feed the metal up to the cutters, and effect the shifting movement, differs essentially from mine, and I here limit my claim to the combination, with such cutting apparatus, of the peculiarly-constructed feeding and shifting apparatus described, wherein the feed-rollers, which are straight cylinders, without collars or shoulders, perform only the function of moving the strip or strips of metal up to the cutters, the function of guiding the strip or strips laterally, and keeping them in position while being shifted from side to side, being performed by notched or recessed guide-bars of the feed-carriage.

What I claim as my invention, and desire to secure by Letters Patent, is—

1. The combination, in the feed mechanism of a machine for cutting glazier's points, of the notched guide-bars $j\ k$, and the rollers I H, mounted on a reciprocating carriage, and constructed to operate with the cutters $a$ and $c$, as and for the purpose described.

2. The combination, in the feed mechanism of a machine for cutting glazier's points, of the adjustable guides $n$ with the notched guide-bars $j\ k$, all constructed to operate with the cutters $a$ and $c$, and the feed-rollers I H, as and for the purpose specified.

In witness I have hereunto set my hand this 6th day of March, 1875.

JAMES M. JAY.

Witnesses:
B. S. CLARK,
J. P. FITCH.